United States Patent
Osman et al.

(10) Patent No.: US 8,134,316 B2
(45) Date of Patent: Mar. 13, 2012

(54) METHOD FOR BRAKING AN AC MOTOR

(75) Inventors: Richard H. Osman, Pittsburgh, PA (US); Mukul Rastogi, Monroeville, PA (US)

(73) Assignee: Siemens Industry, Inc., Alpharetta, GA (US)

( * ) Notice: Subject to any disclaimer, the term of this patent is extended or adjusted under 35 U.S.C. 154(b) by 417 days.

(21) Appl. No.: 12/389,935

(22) Filed: Feb. 20, 2009

(65) Prior Publication Data

US 2009/0212724 A1    Aug. 27, 2009

Related U.S. Application Data

(60) Provisional application No. 61/030,331, filed on Feb. 21, 2008, provisional application No. 61/030,342, filed on Feb. 21, 2008.

(51) Int. Cl.
*H02P 3/12*      (2006.01)

(52) U.S. Cl. .... 318/381; 318/375; 318/269; 318/400.02

(58) Field of Classification Search ................. 318/375, 318/376, 381, 268, 269, 400.02, 400.2
See application file for complete search history.

(56) References Cited

U.S. PATENT DOCUMENTS

| | | | | |
|---|---|---|---|---|
| 4,093,900 A * | 6/1978 | Plunkett | ........................ | 318/370 |
| 4,426,606 A * | 1/1984 | Suita et al. | ................... | 318/375 |
| 5,847,533 A * | 12/1998 | Hakala et al. | ................ | 318/798 |
| 5,992,950 A * | 11/1999 | Kumar et al. | ................ | 303/151 |
| 6,137,258 A * | 10/2000 | Jansen | ........................ | 318/802 |
| 7,012,392 B2 * | 3/2006 | Nguyen et al. | ................ | 318/376 |
| 7,066,034 B2 * | 6/2006 | Ying Yin Ho | ............ | 73/862.193 |
| 7,170,245 B2 * | 1/2007 | Youm | ........................... | 318/375 |
| 7,368,889 B2 * | 5/2008 | Youm et al. | ................... | 318/801 |

* cited by examiner

*Primary Examiner* — Walter Benson
*Assistant Examiner* — Thai Dinh

(57) ABSTRACT

A system for braking a motor. The system includes at least one resistor and a contactor connected to the at least one resistor and a motor. The system further includes a variable frequency drive electrically connected to the motor, wherein the variable frequency drive comprises a controller operably connected to the contactor, wherein at least a portion of the contactor closes connecting the at least one resistor to the motor in response to a command from the controller. The variable frequency drive is configured such that motor flux levels may be maintained at a relatively high level as motor torque current is reduced, resulting in a consistently high motor flux level as the motor speed decreases.

16 Claims, 6 Drawing Sheets

METHOD FOR BRAKING AN AC MOTOR

CROSS REFERENCE TO RELATED APPLICATIONS

This application claims the priority benefit of U.S. Provisional Patent Application No. 61/030,331 filed on Feb. 21, 2008 and U.S. Provisional Patent No. 61/030,342 filed on Feb. 21, 2008.

BACKGROUND

This application discloses an invention that is related, generally and in various embodiments, to a method and system for braking an AC motor. More specifically, this application is related to braking an AC motor with a variable frequency drive.

A variable frequency drives are typically devices used to control the rotational speed of an alternating current (AC) motor by controlling the frequency of electrical power delivered to the motor. For example, variable frequency drives, and accompanying control circuits, are described in detail in U.S. Pat. No. 7,327,111 to Rastogi et al., the disclosure of which is hereby fully incorporated by reference.

FIG. 1 illustrates an exemplary variable frequency drive 100 for providing electrical power to motor 130. Variable frequency drive 100 includes a control circuit 110 and a power circuit 115. Control circuit 110 receives incoming input commands 105. Input commands 105 may be a request to increase or decrease the speed of the motor 130, which requires variable frequency drive 100 to adjust the electrical power output by power circuit 115 and delivered to motor 130. Control circuit 110 monitors current feedback 120 and voltage feedback 125 from the outputted electrical power to determine if any changes should be made to the output to either adjust or maintain conditions at motor 130. For synchronous motor applications, the variable frequency drive may also include a field supply. The control circuit controls the operation of the power circuit and, for synchronous motor applications, also enables/disables the associated field supply. The power circuit may include a rectifier and an inverter, and provides power to the windings of motor 130 connected to the variable frequency drive 100. For synchronous motor applications, the field supply provides power to an exciter for a motor field circuit.

Control circuit 110 typically includes a speed regulator, a flux regulator, a magnetizing current regulator, a torque current regulator, a DQ-3Φ transform, a pulse width modulator, and a motor model. The speed regulator provides a torque current reference, and the flux regulator provides a magnetizing current reference. The control circuit compares the magnetizing current reference to a measured magnetizing current, and the magnetizing current regulator determines a Q-axis voltage reference. The control circuit also compares the torque current reference to a measured torque current, and the torque current regulator determines a D-axis voltage reference. Additional feed-forward signals may be added to the D-axis voltage reference and the Q-axis voltage reference to provide a higher dynamic response. The DQ-3Φ transform transforms the Q-axis voltage reference and the D-axis voltage reference from two-phase information into three-phase values. The pulse width modulator converts the three-phase values to switching commands that are sent to the power circuit. The motor model generally utilizes measured voltage and/or current signals to determine motor parameters such as the motor speed, the motor flux, the motor flux angle, etc. For applications where low cost is a business requirement, the motor model may only utilize the variable frequency drive output current or the motor current to determine motor parameters. The motor model also converts measured currents into a magnetizing current component and a torque current component for use in the magnetizing current regulator and the torque current regulator, respectively. The D-axis is aligned with the stator flux.

Many of the functions performed by the control circuit 110 are implemented in software. The software is written such that calculations are done at two or more different rates so as to save processor execution time. In general, the pulse width modulator operates at the fastest rate and is usually implemented in hardware. The magnetizing current regulator, the torque current regulator, and the DQ-3Φ transform blocks are typically executed at a data rate of 1-10 kilohertz so that a fast response of the control is achieved in limiting the output current of the variable frequency drive in case of sudden changes in the load or the output circuit. The speed regulator and the flux regulator typically operate at a slower rate of 100-1000 hertz because both motor speed and motor flux change at a much slower rate than the magnetizing current and the torque current. The motor model also is usually computed at this rate. Communications from the control circuit to the outside world, which includes communications to an external device (from the customer), is typically at a rate of 1-10 hertz.

In applications where infrequent, but fast, braking of the motor is required, a 4-quadrant drive connected to the motor may be utilized to realize the braking. However, the relatively high cost associated with a 4-quadrant drive renders this approach infeasible for some of such applications.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Thus, for example, reference to a "motor" is a reference to one or more motors and equivalents thereof known to those skilled in the art, and so forth. Unless defined otherwise, all technical and scientific terms used herein have the same meanings as commonly understood by one of ordinary skill in the art. As used herein, the term "comprising" means "including, but not limited to."

In one general respect, the embodiments disclose a system for braking a motor. According to various embodiments, the system includes at least one resistor and a contactor connected to the at least one resistor and a motor. The system further includes a variable frequency drive electrically connected to the motor, wherein the variable frequency drive comprises a controller operably connected to the contactor, wherein at least a portion of the contactor closes connecting the at least one resistor to the motor in response to a command from the controller.

In another general respect, the embodiments disclose a method for braking a motor. According to various embodiments, the method includes the step of detecting, by a variable frequency drive, a reduction in speed demand, wherein the reduction initiates deceleration of an motor. The method may also include the steps of issuing a command by the variable frequency drive to close at least one contactor, wherein the closed contactor connects a resistor bank to the motor, and absorbing, by the resistor bank, deceleration current generated by the motor.

In another general respect, the embodiments disclose a system for braking a motor. According to various embodiments, the system includes a resistor bank having a plurality of phases, a contactor connected to the resistor bank and a motor, the contactor having a plurality of phases, wherein each phase of the contactor is connected to one phase of the resistor bank. The system further includes a variable frequency drive electrically connected to the motor, wherein the variable frequency drive comprises a controller operably connected to the contactor, wherein at least a portion of the contactor closes connecting the at least one resistor to the motor in response to a command from the controller.

DESCRIPTION OF DRAWINGS

Various embodiments of the invention are described herein by way of example in conjunction with the following figures.

DETAILED DESCRIPTION

Figure 2:
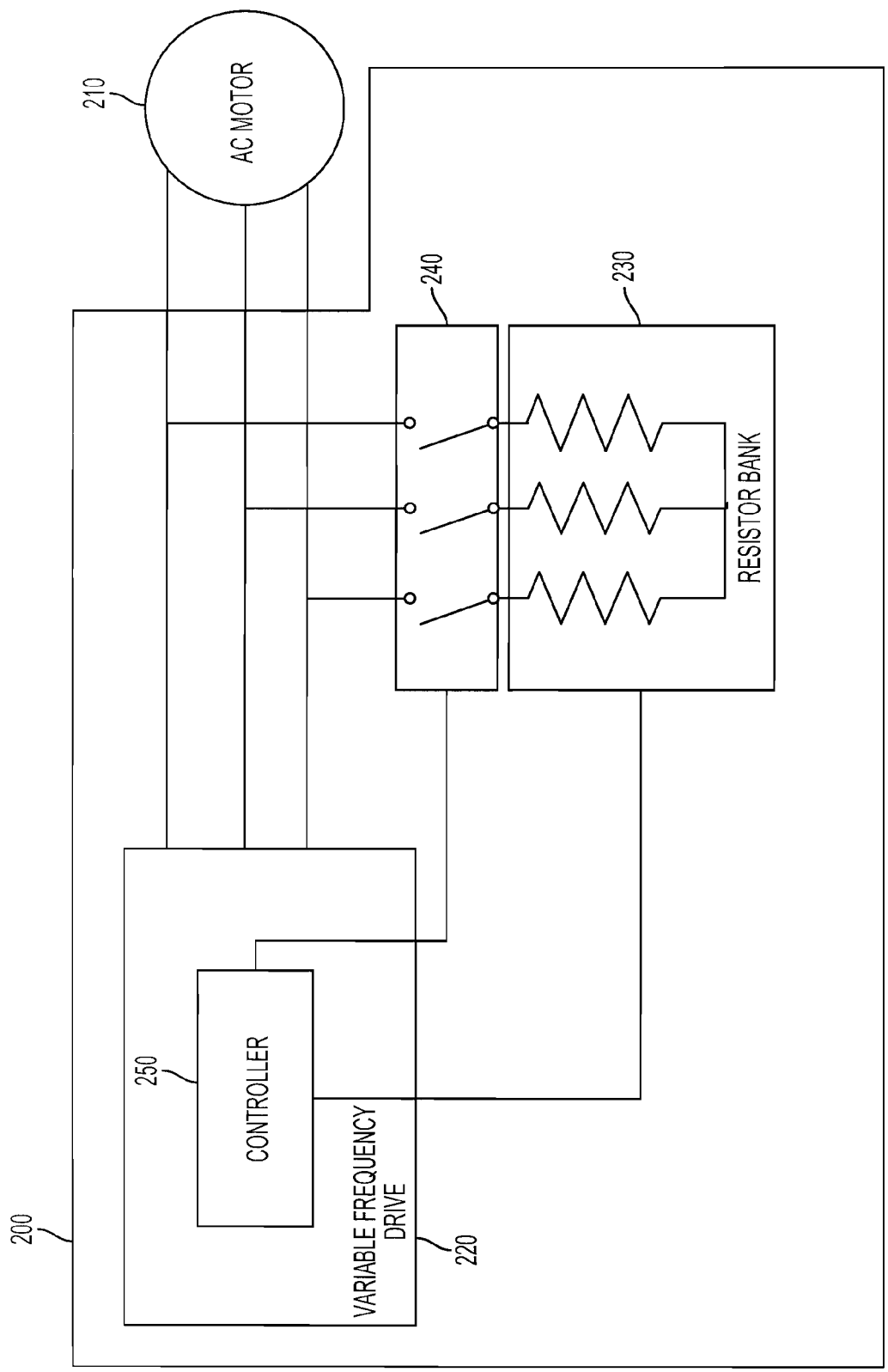
FIG. 2 illustrates various embodiments of a system for braking an AC motor.

FIG. 2 illustrates various embodiments of a system 200 for braking an AC motor 210. The system 200 includes a variable frequency drive 220, a resistor bank 230 and a three-phase contactor 240 connected to the variable frequency drive 220. As discussed above, the variable frequency drive 220 may be configured to control the rotation of AC motor 210 by controlling the frequency of the electrical power supplied to the AC motor. The variable frequency drive 220 may include a controller 250 connected to the contactor 240. Any 3-phase AC drive that is equipped with a motor control algorithm as is discussed herein may be used as the variable frequency drive 220. The variable frequency drive 220 may increase motor flux at low speeds to increase the energy dissipated in the resistor bank 230, thereby allowing faster deceleration. In various embodiments, a three-phase contactor 240 may be used to connect the resistor bank 220 to the AC motor 210 when braking is required. Control of the contactor 240 may be established through the variable frequency drive 220.

Figure 3:
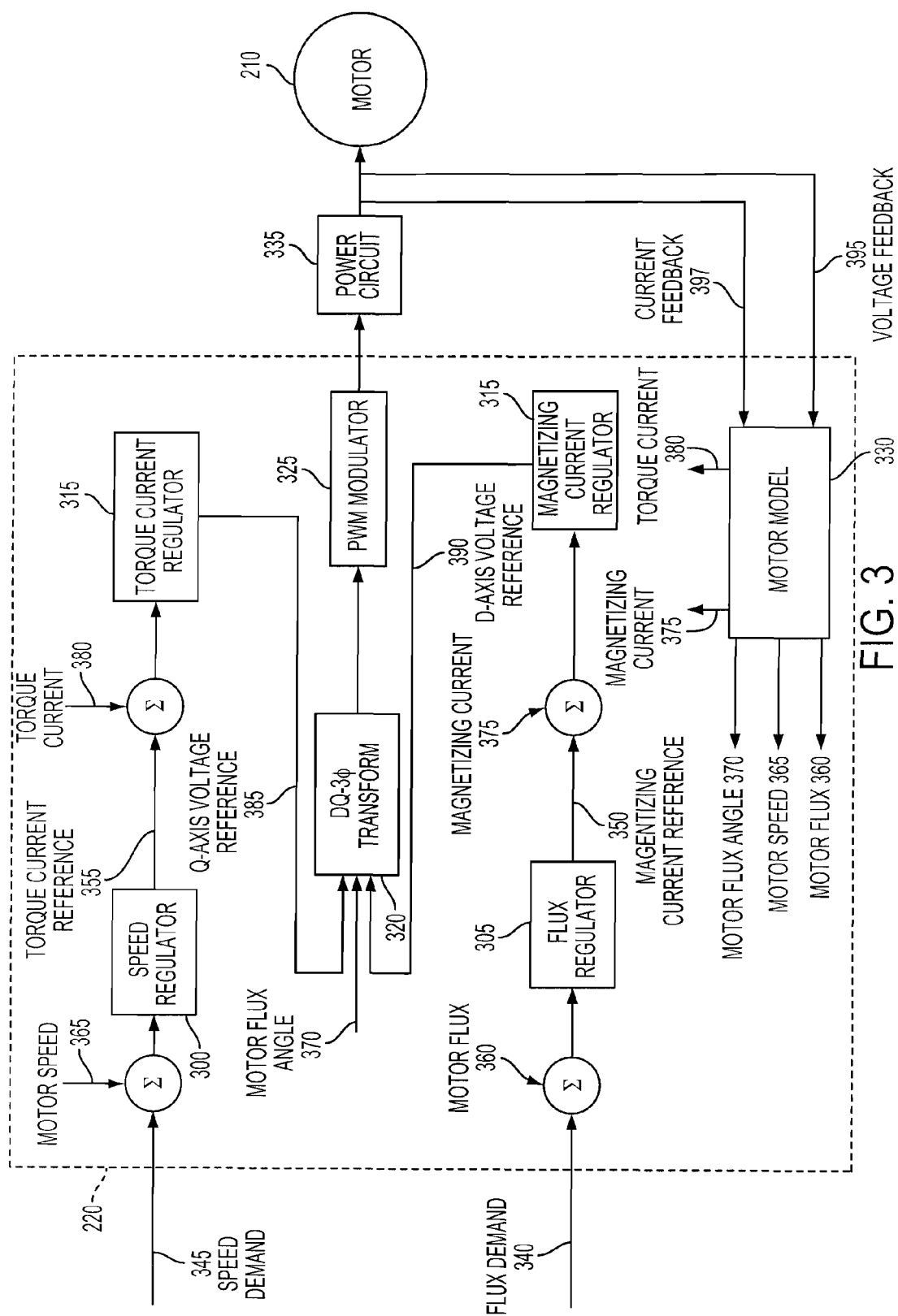
FIG. 3 illustrates various embodiments of the variable frequency drive of FIG. 1.

FIG. 3 illustrates various embodiments of the variable frequency drive 220 of FIG. 2. The variable frequency drive 220 may comprise a speed regulator 300, a flux regulator 305, a magnetizing current regulator 310, a torque current regulator 315, a DQ-3Φ transform 320, a pulse width modulator 325 and a motor model 330. Each component will be described in more detail below.

As illustrated, the variable frequency drive 220 may receive the flux demand 340 and the speed demand 345 as inputs. In various embodiments, the flux regulator 305 compensates for the difference between the flux reference and the flux feedback. The flux demand 340 and the actual motor flux 360 as provided by the motor model 330 may be compared by the flux regulator 305. The output of the flux regulator 305, as determined based upon the comparison of the flux demand 340 and the actual motor flux 360, may be the motor magnetizing current reference 350.

In various embodiments, the speed regulator 300 may compare the speed demand 345 with the motor speed 365 as provided by the motor model 330 and provides the motor torque current reference 355 as an output. In certain embodiments, where the speed demand 345 is less than the actual motor speed 365, thereby indicating a desire to brake the AC motor 210, speed regulator 300 may output a torque current reference 355, thereby indicating the voltage commands being transmitted to the motor may be reduced in order to facilitate braking of the motor.

In various embodiments, the motor model 330 uses the voltage feedback 395 and current feedback 397 from the variable frequency drive 220 output to estimate the motor flux 360, the motor speed 365 and the motor flux angle 370. In addition, the motor model 330 may also determine the magnetizing current 375 and the torque current 380. The motor model 330 may be a processor having a memory with a stored set of instructions. Based upon the received voltage feedback 395 and current feedback 397, the motor model may process the feedback information according to the stored instructions to create estimated values for various aspects of AC motor 210, specifically in this example, motor flux 360, motor speed 365, motor flux angle 370, magnetizing current 375, and torque current 380.

The magnetizing current regulator 310 may compare the magnetizing current reference 350 with the magnetizing current 375 as provided by the motor model 330 to produce a #-D-axis voltage reference 390. Similarly, the torque current regulator 315 may compare the torque current reference 355 with the torque current 380 as output by the motor model 330 to produce a Q-axis voltage reference 385. Both D-axis voltage reference 390 and Q-axis voltage reference 385 may be transformed into a single phase voltage signal at DQ-3Φ transform 320. The DQ-3Φ transform 320 may be a mathematical algorithm implemented in software, programmed to operate on the motor flux 370, the magnetizing current 375, and the torque current 380, decomposing the current signals into components parallel to the motor flux (D-axis) and in quadrature to the motor flux (Q-axis). DQ-3Φ transform 320 may further transform the single phase voltage signal into a three-phase voltage signal based upon motor flux angle 370. The three-phase voltage signal may be used as a reference for pulse width modulator 325 to generate a pulse width modulator voltage command for controlling semiconductor devices in the power circuit 335.

It should be noted that the components of variable frequency drive 220 may be implemented on a single processor operably connected to a memory for storing various instructions related to a method for braking a motor. Specifically, the variable frequency drive may receive flux demand 340 and speed demand 345 as inputs, process the information as discussed above to produce the three-phase voltage signal, and based upon the value of this signal, load appropriate instructions from the memory for altering the operation of the AC motor 210.

Figure 1:
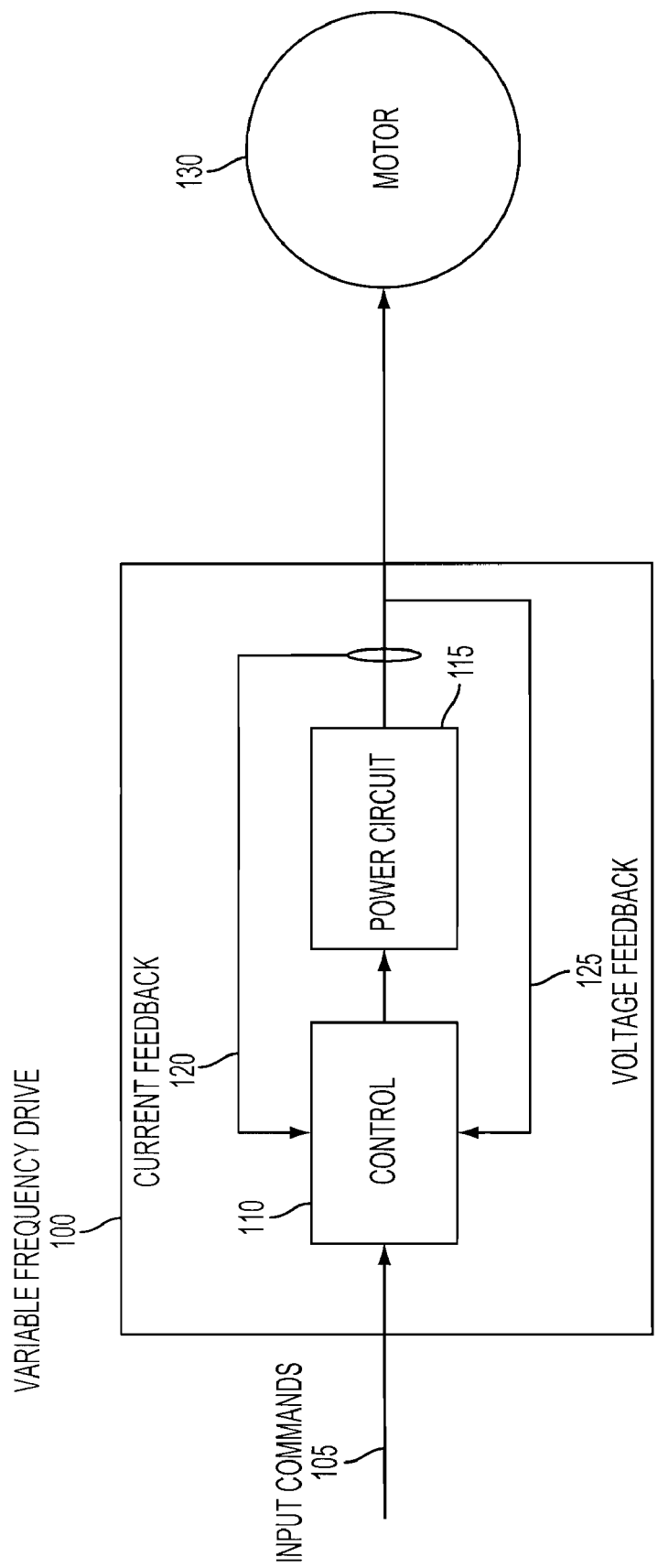
FIG. 1 illustrates an exemplary variable frequency drive.
Figure 4:
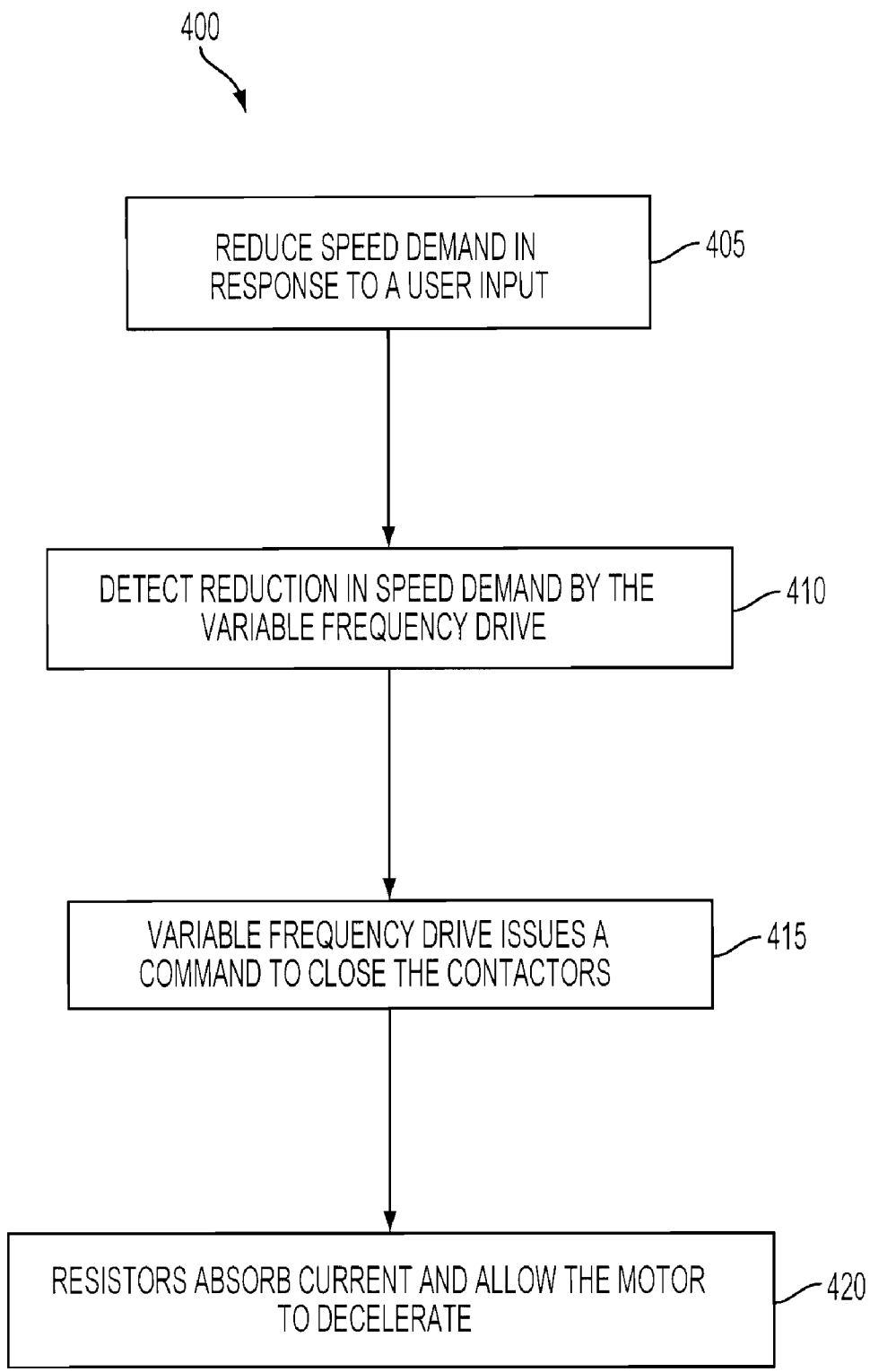
FIG. 4 illustrates various embodiments of a method for braking an AC motor.

FIG. 4 illustrates various embodiments of a method 400 for braking an AC motor. The system 200 as discussed above in FIG. 1 and the variable frequency drive 220 as discussed in detail in FIG. 2 may be utilized to implement the method 400. The process flow of the method 400 begins when, in response to a user input, the speed demand 345 may be reduced 405 to initiate a speed reduction request for AC motor 210. Upon reduction 405 of the speed demand 345, variable frequency drive 220 may detect 410 the change in speed demand as a result of the comparison of motor speed 365 and speed demand made by speed regulator 300. This comparison may result in a negative torque current reference 355, indicating appropriate instructions should be produced or loaded from memory to initiate braking AC motor 210. Based upon the magnitude of the difference in the speed demand 345 and the motor speed 365, a command (e.g., the output of pulse width modulation modulator 325) may be produced to be sent from the variable frequency drive 220 to contactor 240.

After detecting the reduction 410 in the speed demand 345 and producing a command, the variable frequency drive 220 issues 415 the command to the three-phase contactor 240 to connect the resistor bank 230 to the AC motor 210. It should be noted that an approximately balanced resistor bank 230 may be used to limit any fluctuations in motor torque across phases. In some applications where a high level of potential motor torque fluctuations may be acceptable during braking, two phases of the three-phase contactor 240 may be closed, thereby only connecting a portion of the resistor bank 230 to the AC motor 210.

As the three-phase contactor 240 connects the resistor bank 230 to the AC motor 210, the variable frequency drive 220 may also begin to decrease the torque current 380 to its reverse regeneration limit. It should be noted that after torque current 380 is decreased, and motor speed 365 begins to drop, variable frequency drive 220 may maintain motor flux 360 at a higher value until motor torque reaches approximately zero. In various embodiments, other 2-quadrant drives may be used provided the controller provides fast regulation of the drive current and maintains motor flux during the deceleration process.

After issuing 415 the command to the contactor 240 to connect the resistor bank 230 to the AC motor 210, the resistors now operably connected to the AC motor absorb 420 any current generated by the AC motor resulting in the deceleration of the AC motor. While the variable frequency drive 220 may operate at a small value of regenerative current, the resistors 230 may be able to absorb a significant amount of reverse torque current and allow the AC motor 210 to quickly decelerate. As the variable frequency drive 220 may maintain motor flux 360 during the deceleration process, the motor voltage may decrease linearly with speed.

Figure 5:
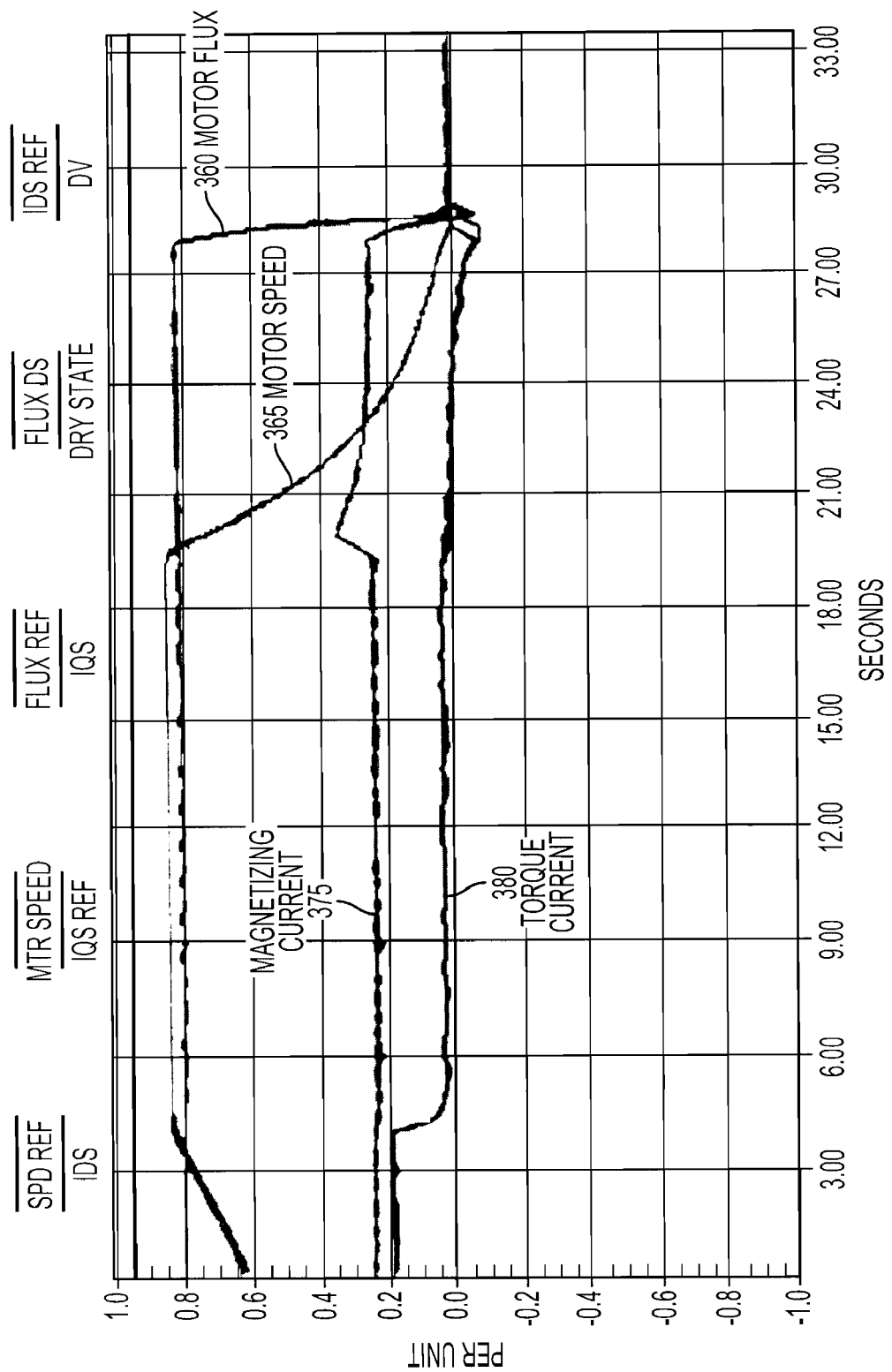
FIG. 5 illustrates exemplary waveforms generated during the deceleration of an AC motor.

FIG. 5 illustrates exemplary waveforms generated during the deceleration of an AC motor, specifically illustrating motor flux 360, motor speed 365, magnetizing current 375 and torque current 380 as discussed above in FIG. 3. For this implementation, the AC motor was a 4160V, 600 hp induction motor, and the deceleration was realized using a 2-quadrant variable frequency drive and a 3-phase resistor bank. The resistor bank was sized to operate with a 90% current at a rated motor voltage (e.g., 67 amperes), and deceleration from full speed to zero was completed in less than nine seconds. The variable frequency drive was able to maintain stable operation (as indicated by a stable value for motor flux 360) during deceleration despite the change in impedance caused by the connection of the resistors as well as the change in torque current 380. The variable frequency drive was also be able to adequately limit the output current without causing any over-voltage trips in the cells as indicated by the relatively stable values for magnetizing current 375 and torque current 380 while motor flux 365 and motor speed 370 are decreasing quickly, which indicates that the variable frequency drive did not absorb any more power than its normal capability, and that the additional braking power from the motor was dissipated in the resistors.

Figure 6:
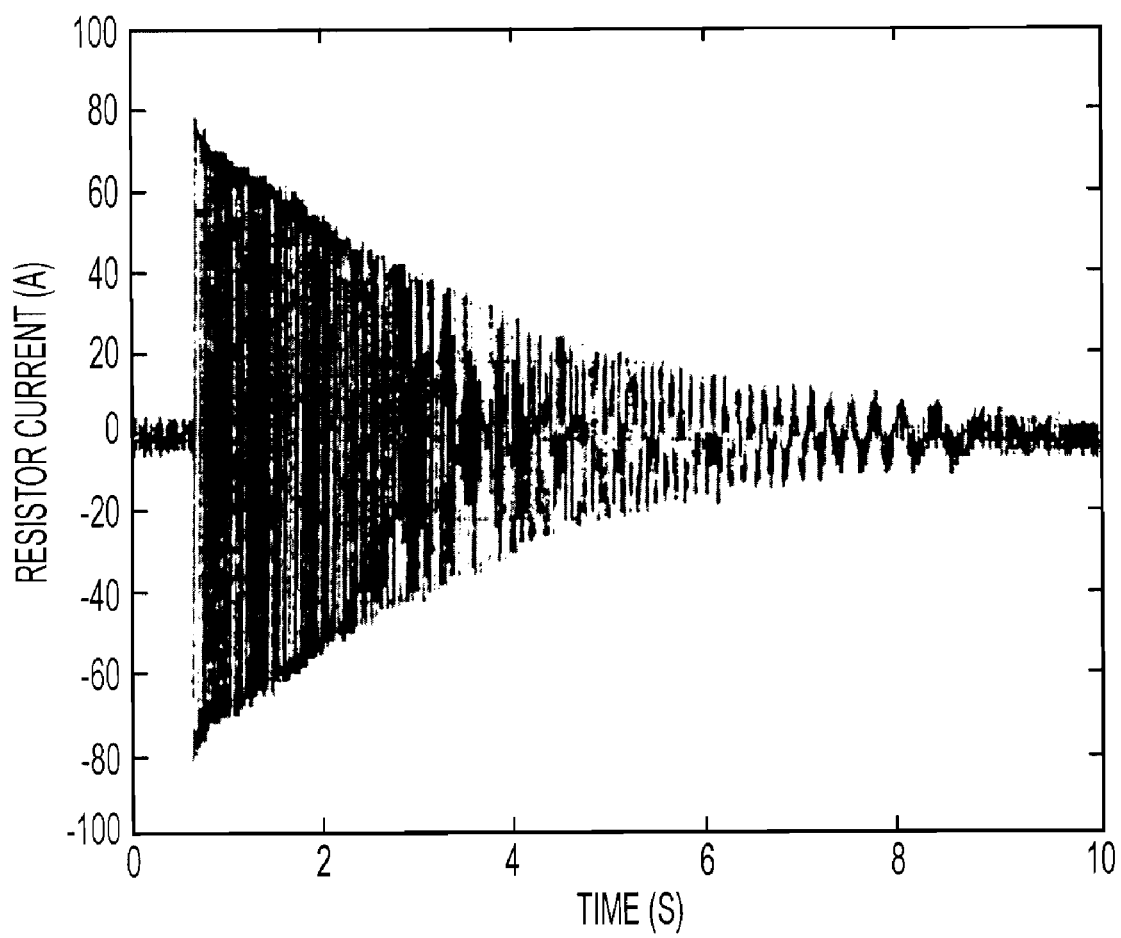
FIG. 6 illustrates a plot of resistor current through one of the phases during the deceleration corresponding to FIG. 5.

FIG. 6 illustrates a plot of resistor current through one of the phases during the deceleration corresponding to FIG. 5. According to various embodiments, as the motor slows downs, the voltage across its terminals may also decrease, thereby decreasing the current through the resistors and reducing braking torque. As the variable frequency drive is connected to the motor during the deceleration process, the variable frequency drive may be controlled to apply extra voltage to the motor as its speed decreases. For example, a typical motor can tolerate 10% more voltage at a rated speed. If 10% more voltage is applied at all speeds below the rated value, then the motor may provide 21% (or $1.1^2=1.21$) more braking torque. At lower speeds, the motor core losses are relatively low compared to copper losses. As such, the motor flux may be increased above 10% of the typical value so that higher braking torque may be produced. Higher braking torque may result in a significant reduction in the total time required to stop the motor. It should be noted that the example described above, when used during infrequent braking, it may be possible to raise the motor flux significantly for the duration of a braking interval without motor overheating.

While several embodiments of the invention have been described herein by way of example, those skilled in the art will appreciate that various modifications, alterations and adaptations to the described embodiments may be realized without departing from the spirit and scope of the invention. For example, although the method 400 is described with reference to a particular sequence, those skilled in the art will appreciate that some steps may occur in a different sequence, some steps may occur concurrently with other steps, and some steps may occur on a periodic or continuous basis.

What is claimed is:

1. A system for braking a motor, comprising:
   at least one resistor;
   a contactor connected to the at least one resistor and a motor; and
   a variable frequency drive electrically connected to the motor, wherein the variable frequency drive comprises:
      a motor model configured to receive one or more inputs and produce a plurality of first outputs,
      a speed regulator operably connected to the motor module and configured to process at least a portion of the plurality of first outputs to produce a second output,
      a flux regulator operably connected to the motor model and configured to process at least a portion of the plurality of first outputs to produce a third output,
      a torque current regulator operably connected to the motor model and configured to process at least a portion of the plurality of first outputs and the second output to produce a first reference voltage, and
      a magnetizing current regulator operably connected to the motor model and configured to process at least a portion of the plurality of first outputs and the third output to produce a second reference voltage; and
   a controller operably connected to the contactor and the variable frequency drive and configured to:
      load instructions for braking the motor based upon at least the first reference voltage and the second reference voltage, and
      bases upon the loaded instruction, issue a braking command to the contactor, wherein at least a portion of the contactor closes connecting the at least one resistor to the motor in response to the braking command from the controller.

2. The system of claim 1, wherein the motor model that is configured to receive voltage feedback and current feedback from the variable frequency drive, process the voltage feedback and current feedback, and output motor flux, motor speed, magnetizing current, torque current and motor flux angle.

3. The system of claim 2, wherein the speed regulator is configured to process the motor speed and producing a reference torque current.

4. The system of claim 3, wherein the flux regulator is configured to process the motor flux and produce a reference magnetizing current.

5. The system of claim 4, wherein the torque current regulator is configured to process both the reference torque current and the torque current and produce a reference Q-Axis voltage, and wherein the as well as a magnetizing current regulator is configured to process both the reference magnetizing current and the magnetizing current and produce a reference D-Axis voltage.

6. The system of claim 5, wherein the variable frequency drive further comprises a DQ-3Φ transform configured to process both the reference Q-Axis voltage and the reference D-Axis voltage to produce a three phase electrical output.

7. The system of claim 6, wherein the variable frequency drive further comprises a pulse width modulation modulator configured to produce pulse width modulated voltage commands.

8. The system of claim 1, wherein the contactor is a three-phase contactor.

9. The system of claim 8, wherein the at least one resistor is a three-phase resistor bank.

10. The system of claim 9, wherein controller commands instruct the contactor to close thereby connecting the three-phase resistor bank to the motor.

11. A method for braking a motor, the method comprising:
detecting, by a variable frequency drive, a reduction in speed demand, wherein the reduction initiates deceleration of an motor and wherein the detecting comprises:
producing, by a motor model, a plurality of first outputs based upon one or more received inputs,
producing, by a speed regulator operably connected to the motor model, a second output based upon at least a portion of the plurality of first outputs,
producing, by a flux regulator operably connected to the motor model, a third output based upon at least a portion of the plurality of first outputs,
producing, by a torque current regulator operably connected to the motor model, a first reference voltage based processing at least a portion of the plurality of first outputs and the second output,
producing, by a magnetizing current regulator operably connected to the motor model, a second reference voltage based processing at least a portion of the plurality of first outputs and the third output, and
loading, at a controller operably connected to the variable frequency drive, instructions for braking a motor based upon at least the first reference voltage and the second reference voltage;
issuing a command by the variable frequency drive to close at least one contactor, wherein the closed contactor connects a resistor bank to the motor; and
absorbing, by the resistor bank, deceleration current generated by the motor.

12. The method of claim 11, wherein the issuing a command comprises issuing a command by the variable frequency drive to close at least two phases of a three-phase contactor, wherein the at least two closed phases of the three-phase contactor connect at least two phases of a resistor bank to the motor.

13. The method of claim 12, wherein a determination to close the three-phase contactor is made by the variable frequency drive based upon the detected reduction in speed demand.

14. A system for braking a motor, the system comprising:
a resistor bank having a plurality of phases;
a contactor connected to the resistor bank and a motor, the contactor having a plurality of phases, wherein each phase of the contactor is connected to one phase of the resistor bank; and
a variable frequency drive electrically connected to the motor, wherein the variable frequency drive comprises:
a motor model configured to receive one or more inputs and produce a plurality of first outputs,
a speed regulator operably connected to the motor module and configured to process at least a portion of the plurality of first outputs to produce a second output,
a flux regulator operably connected to the motor model and configured to process at least a portion of the plurality of first outputs to produce a third output,
a torque current regulator operably connected to the motor model and configured to process at least a portion of the plurality of first outputs and the second output to produce a first reference voltage, and
a magnetizing current regulator operably connected to the motor model and configured to process at least a portion of the plurality of first outputs and the third output to produce a second reference voltage; and
a controller operably connected to the contactor and the variable frequency drive and configured to:
load instructions for braking the motor based upon at least the first reference voltage and the second reference voltage, and
bases upon the loaded instruction, issue a braking command to the contactor, wherein at least a portion of the contactor closes connecting the at least one resistor to the motor in response to the braking command from the controller.

15. The system of claim 14, wherein the contactor is a three-phase contactor.

16. The system of claim 15, wherein the resistor bank is a three-phase resistor bank.

* * * * *